Nov. 15, 1955 — W. H. CRAWFORD — 2,723,728
CHECK STAND
Filed Aug. 31, 1951 — 5 Sheets-Sheet 1

WAYLAND H. CRAWFORD,
INVENTOR.

BY
Reed C. Lawlor
ATTORNEY.

Nov. 15, 1955 — W. H. CRAWFORD — 2,723,728
CHECK STAND
Filed Aug. 31, 1951 — 5 Sheets-Sheet 2
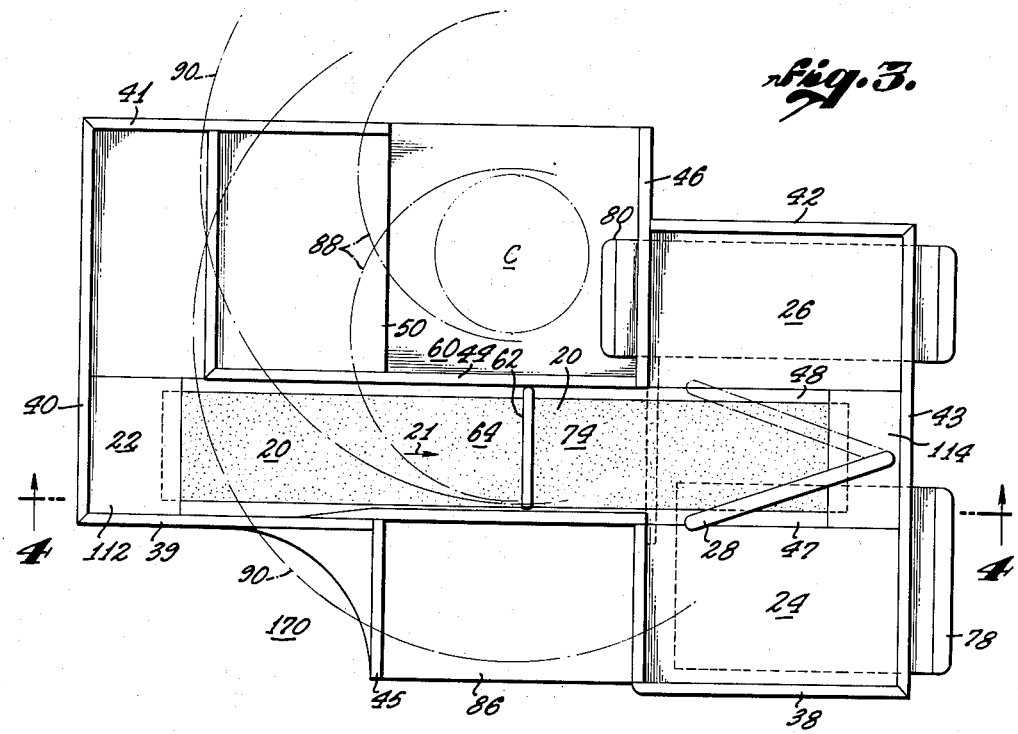
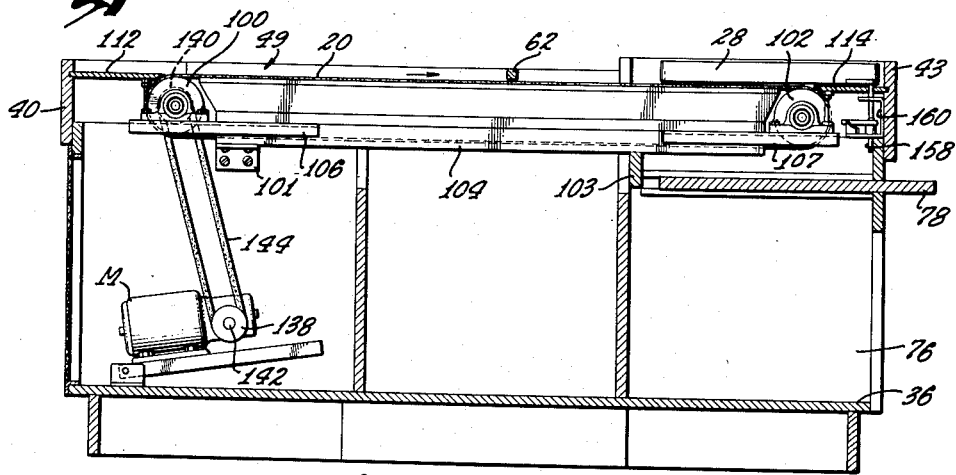
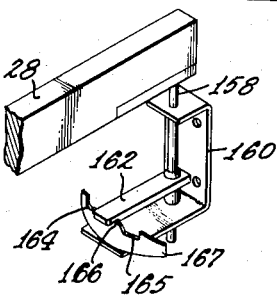
WAYLAND H. CRAWFORD, INVENTOR.
BY
ATTORNEY.

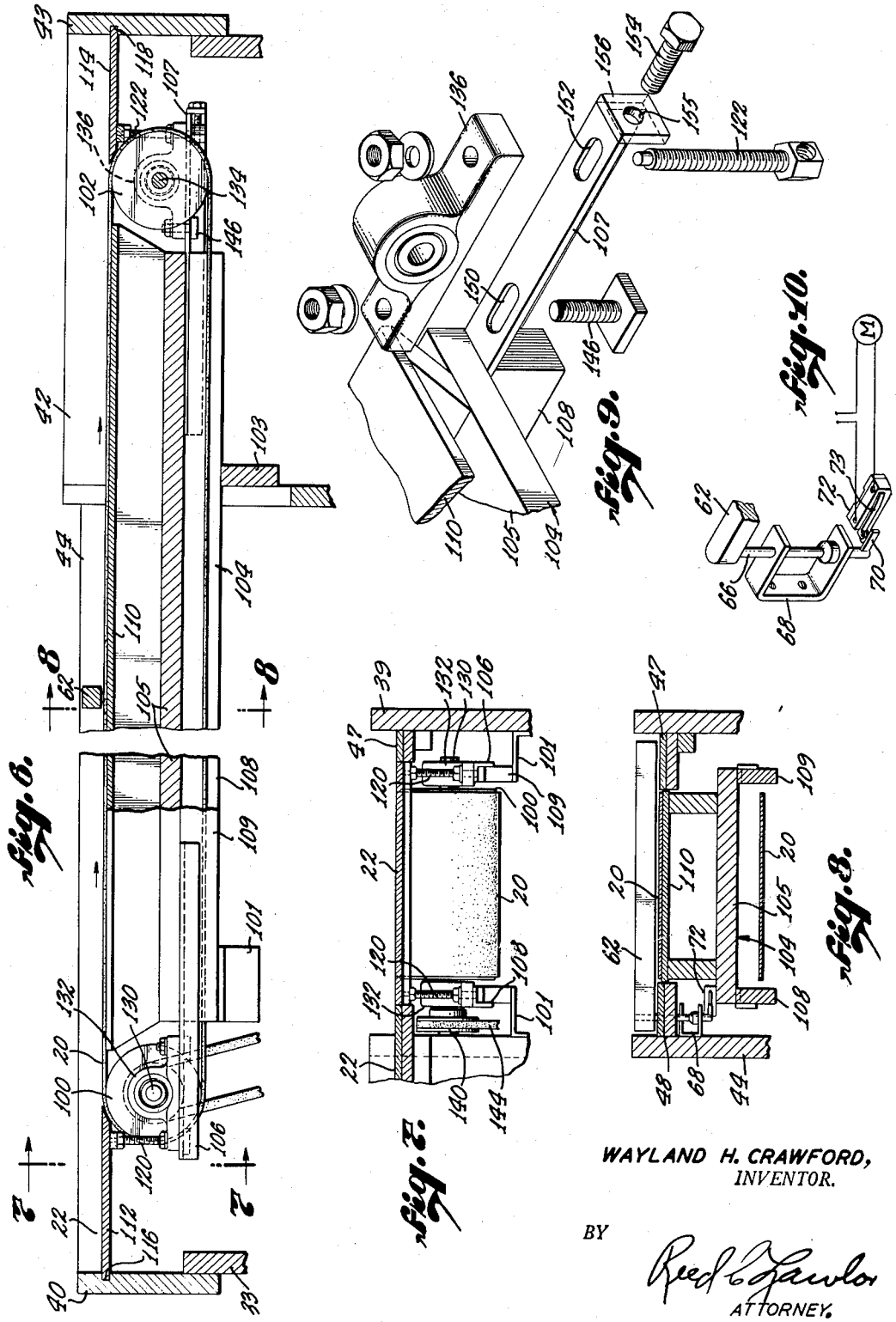

Nov. 15, 1955 W. H. CRAWFORD 2,723,728
CHECK STAND
Filed Aug. 31, 1951 5 Sheets-Sheet 4
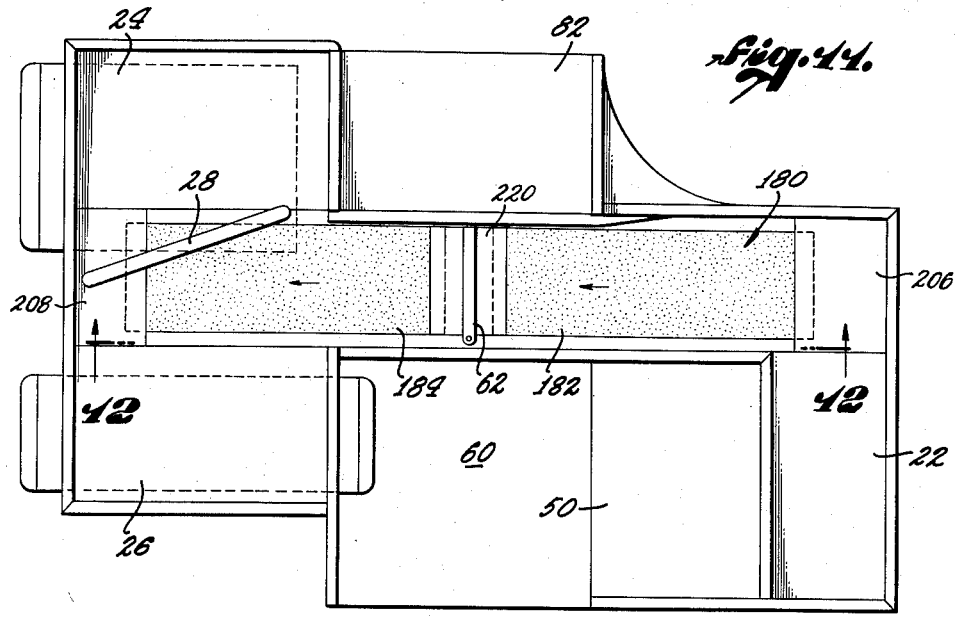
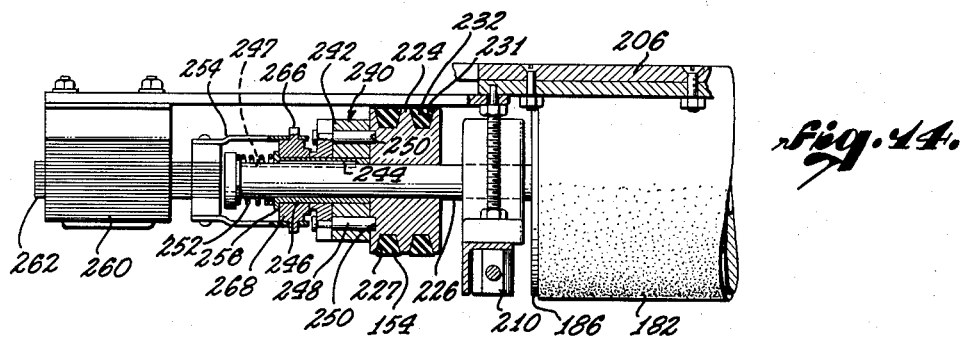
WAYLAND H. CRAWFORD,
INVENTOR.
BY
ATTORNEY.

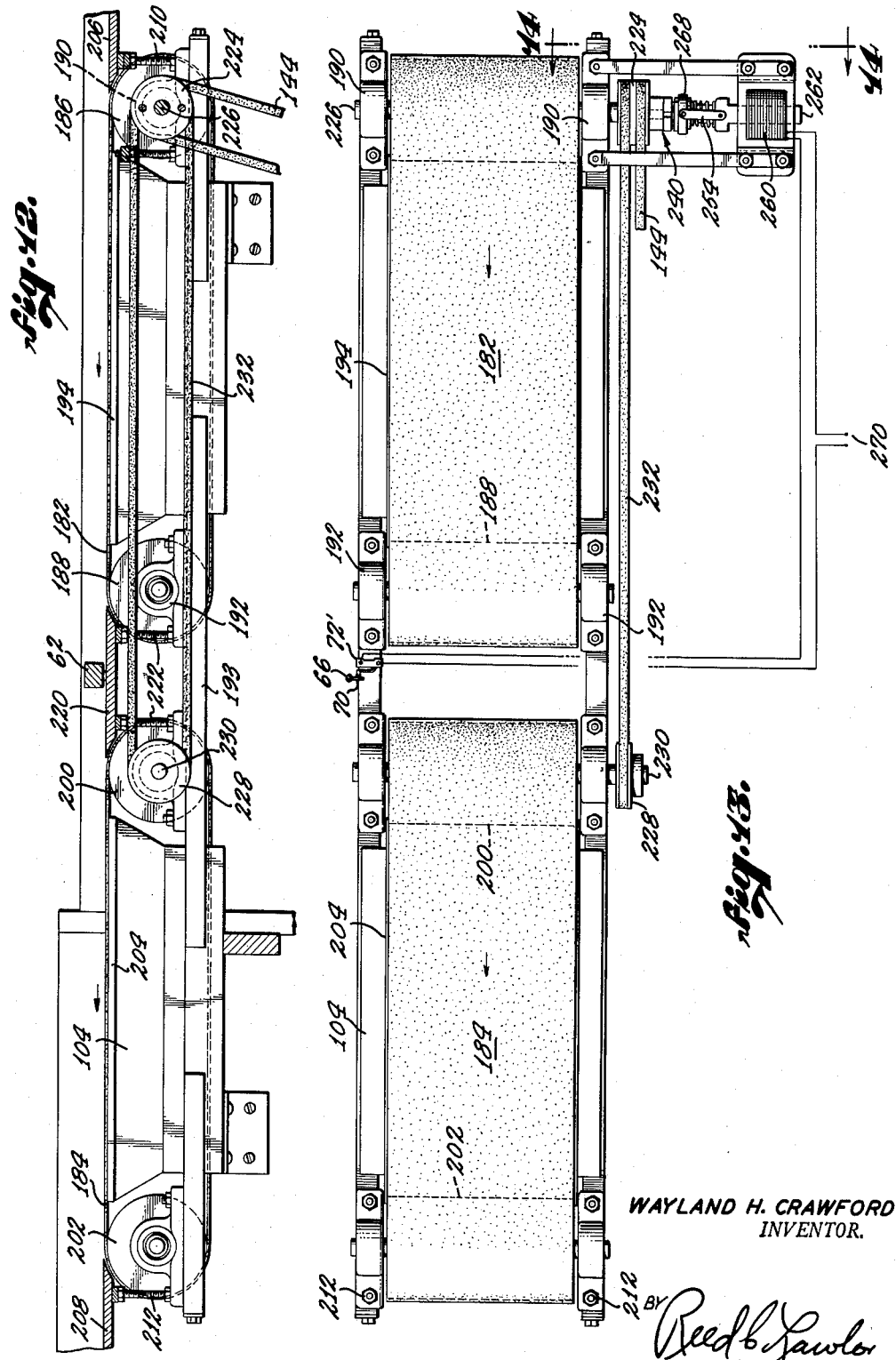

United States Patent Office 2,723,728
Patented Nov. 15, 1955

2,723,728

CHECK STAND

Wayland H. Crawford, San Gabriel, Calif., assignor to Modern Village Stores, Inc., a corporation of California Application August 31, 1951, Serial No. 244,525

10 Claims. (Cl. 186—1)

My invention relates to improvements in check stands that are employed for checking out customers in retail stores, such as grocery stores.

In many grocery stores now in use, customers select their groceries and then cart them in suitable carriages to a checking out point where a checker, or cashier, checks the items purchased and determines the total sale price to be paid by the customer. This method of merchandising has also been extended to other retail stores, such as drug stores, hardware stores, gardening and feed stores, and the like. Where competition is high, as it generally is in most communities, it is highly desirable to perform the checking out operation rapidly, accurately, and with a minimum expense.

In my invention conveyor belt means is employed to feed a succession of items to be checked from an unloading position to a sacking position. In this arrangement the customer unloads the items on a loading platform at the loading position and places them on the conveyor belt means which leads them to a checking position where items are checked by the checker or cashier. The items are then conveyed by the conveyor belt means to a sacking platform where the sacker places the items in suitable bags, boxes, or other containers.

It is an object of my invention to provide an improved check stand that provides for rapid servicing of customers with minimum effort to the checker so that a maximum number of customers may be serviced in a day by a single checker.

Another object of my invention is to provide a check stand with a motor-driven conveyor belt that feeds a succession of items to be checked to a checking position together with means for preventing items from passing a checking point without receiving the checker's attention.

Another object of my invention is to provide a check stand with a motor-driven conveyor belt that feeds a succession of items to be checked to a checking position together with means for discontinuing the movement of the belt if an item does not receive the checker's attention.

Another object of my invention is to provide a check stand with a pair of aligned conveyor belts, one of which serves to feed a succession of items to be checked to a checking position, and the other of which serves to feed the items to a sacking position, together with means for discontinuing the movement of the first belt if an item is not checked while the second belt continues to operate.

Another object of my invention is to provide a check stand with an unloading platform and a sacking platform and a weighing pan, all arranged in such relationship to a conveyor belt as to accelerate checking out of items without unnecessary exertion on the part of the checker.

A still further object of my invention is to provide a check stand employing a conveyor belt with a pair of sacking platforms on opposite sides of the downstream end thereof together with a diverting arm to facilitate discharging items to only one sacking platform at a time.

My invention possesses numerous objects and features of advantage some of which together with the foregoing will be set forth in the following description of two specific forms of my check stand. Though only two forms of check stands embodying my invention are described herein in detail, it is to be understood that my invention is not limited thereto but may be embodied in many other forms within the scope of the appended claims.

In the drawings wherein like reference characters indicate like elements throughout the several views, and in which one embodiment of my invention is illustrated in Figs. 1–10 inclusive, and another form of my invention is illustrated in Figs. 11–14 inclusive:

Fig. 3 is a top plan view of the check stand of Figs. 1 and 2;

Fig. 4 is a longitudinal cross-sectional view of the check stand of Figs. 1 and 2 taken on the line 4—4 of Fig. 3;

Fig. 5 is an enlarged detail view of the diverting arm;

Fig. 6 is a foreshortened enlarged portion of the conveyor belt arrangement of the check stand of Figs. 1 and 2;

Fig. 7 is a vertical sectional view taken on the plane 7—7 of Fig. 6;

Fig. 8 is a vertical sectional view taken on the plane 8—8 of Fig. 6;

Fig. 9 is a fragmentary exploded view of a portion of the check stand;

Fig. 10 is a detail, partly schematic, view of the belt stopping mechanism;

Fig. 11 is a top plan view of a second embodiment of my invention;

Fig. 12 is a longitudinal sectional view taken on line 12—12 of Fig. 11;

Fig. 13 is a top plan view of the conveyor belt means of the check stand of Fig. 11; and Fig. 14 is a detailed view of the driving mechanism of the belt as seen on line 14—14 of Fig. 13.

Figure 1:
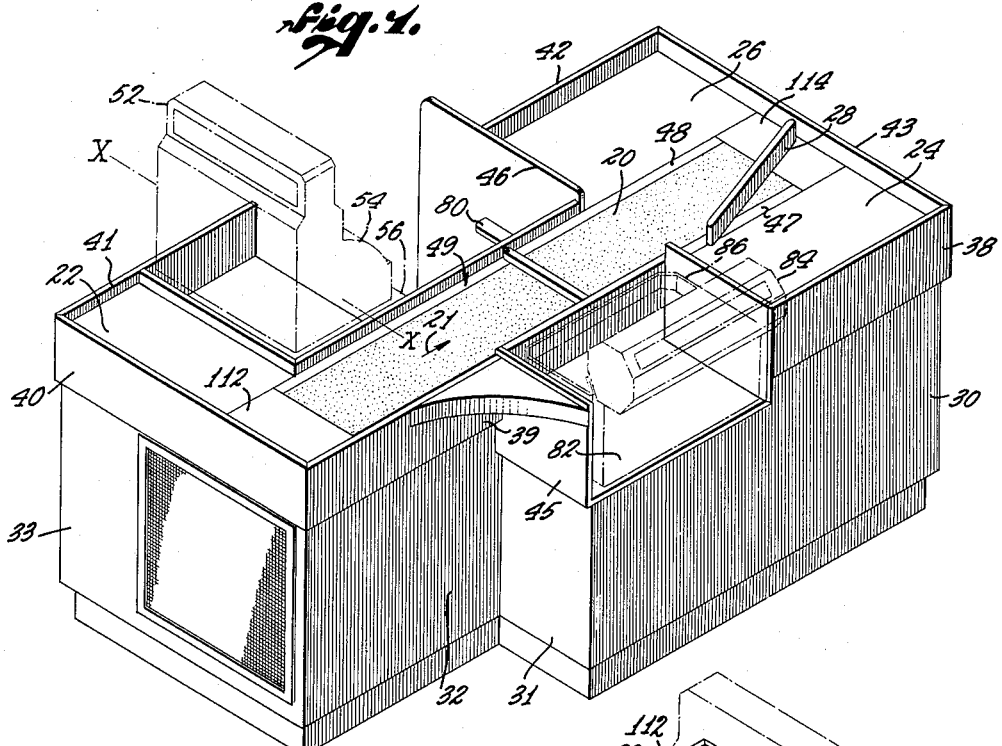
Figures 1 and 2 are isometric views of one form of my improved check stand, the check stand being viewed from the rear and to one side thereof in Fig. 1 and from the front and to the other side thereof in Fig. 2.
Figure 2:
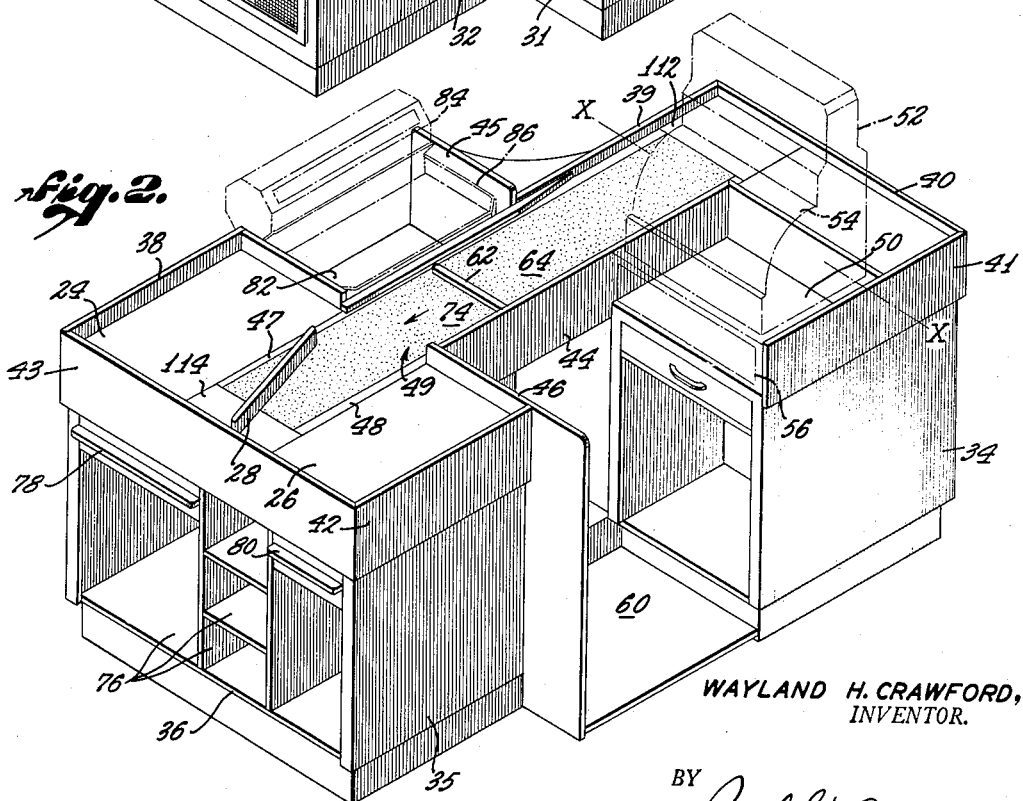

Referring to the drawings, and more particularly to Figs. 1–10 inclusive, there is illustrated a check stand embodying my invention and employing a single conveyor belt 20 to carry a stream of items in the direction of the arrow 21 from a loading platform 22 to sacking platforms 24 or 26 as determined by the position of the diverting arm 28. The platforms 22, 24 and 26 constitute portions of a common horizontal surface supported by vertical walls 30, 31, 32, 33, 34 and 35 extending upwardly from a base support structure including a floor member 36. Guard members 38, 39, 40, 41, 42 secured to the respective walls 30, 32, 33, 34, 35 as well as other guard members 43, 44, 45 and 46 suitably supported between the wall members extend upwardly above the platforms 22, 24 and 26, forming a shallow dish-like top for preventing items from falling off the edges of the platforms. A platform segment 112 is located at the supply end of the belt 20, being a portion of the unloading platform 22. Another platform segment 114 lies at the discharge end of the belt 20 between the two discharge platforms 24 and 26. Platform strips 47 and 48 and platform segments 112 and 114 as well as the guard members 44 and 45 and the conveyor belt 20 constitute a track 49 that extends from the loading platform 22 to the sacking platform 24.

The check stand is of T-configuration at one end where the two sacking platforms 24 and 26 extend from opposite sides of the discharge end of the track 49. The loading platform 22 extends laterally from the loading end of the track 49. A cash register support platform 50 is arranged adjacent to the loading platform 22, being adapted to support a cash register 52 adjacent to the track 48 on the downstream side of the loading platform 22 and upstream from the checking station 60. The axis X—X of the cash register is transverse to, preferably perpendicular to, the length of the track 49, and the keyboard 54 and the cash drawer 56 of the cash register are on the side thereof facing the checking station 60.

The checking station 60 itself is formed by a well-like space established between the cash register 52 and guard wall 46. A checker may stand or sit in the checking station to check items being carried along the conveyor belt 20. In practice, a cross-arm 62 passing through the center of the checking station 60 extends transversely of the track 49 to prevent items from being carried past a checking position 64 opposite the upstream portion of the checking station without receiving proper attention of the checker. As any item is advanced by the conveyor belt 20 to the checking position 64, it is rung up on the cash register by the checker. Since the item cannot be carried past the cross-arm 62 by the conveyor belt 20, it must actually be lifted over the arm 62, thus assuring that the checker handles each item giving it his attention. This handling operation assists the checker in achieving accuracy in ringing up all of the items being checked out.

To further facilitate the checking operation, the cross-arm 62 is pivotally mounted upon a shaft 66 rotatably supported by means of a bracket 68 upon the guard wall 44. The lower end of the shaft 66 is provided with a lever 70 adapted to engage a normally closed microswitch 72 connected in series with an electric motor M that serves to drive the conveyor belt 20, as illustrated schematically in Fig. 9. With this arrangement, if an item to be checked is not lifted by the checker over the cross-arm 62, it impinges upon the cross-arm opening the microswitch displacing it from its normal position, thereby causing the conveyor belt 20 to stop. Thereafter, when that item is raised by the checker the resilient control arm 73 of the microswitch forces the cross-arm to return to its normal or undisplaced position and the microswitch closes, energizing the motor M, thereby causing the conveyor belt 20 to resume its motion.

After the items have been checked, they are placed in another position 74 on the opposite side of the cross-arm 62 downstream from the checking position 64. Thence they are carried by the conveyor belt downstream where they are moved onto one sacking platform 24 or the other 26 according to the setting of the diverting arm 28.

Various compartments 76 are constructed in the wall of the stand beneath the sacking platforms 24 and 26 for the storage of bags required by the sacker. For the further convenience of the sacker, sliding shelves 78 and 80 are provided, it sometimes being convenient to place a bag with its bottom on one of these shelves and to fill the sack with the items. The sliding shelf 80 extends through the guard wall 46, facilitating its movement into the area of the checking station 60 where it may be employed by the checker as a seat.

A scale platform 82 is arranged on the opposite side of the stand from the checking station 60, the platform 82 being so arranged as to support a weighing scale 84 with a weighing pan 86 at about the level of the conveyor belt 20. The center of the weighing pan 86 is just about opposite the center of the checking station, and the cross-arm 62 is arranged slightly downstream from the line joining those centers.

The various portions of this checking platform have been positioned and proportioned in such a way as to facilitate checking rapidly and with minimum fatigue to the checker. More specifically, the cash drawer of the cash register 52 and the checking position 64 to which the items are fed by the conveyor belt 20 are all within what is known as the normal reach area of a person standing or sitting in the central area of the checking station as indicated in Fig. 3. Likewise the keys 54 of the cash register 52, most of the weighing pan 86, and a large portion of the conveyor belt 20 are within the extended reach area of such a person. By normal reach area is here meant the area over which the arms of the person sweep while his elbows remain at his side and he is standing in the central area C of the check station. The outer limits of the normal reach area existing while the person is facing toward the cash register 52 are indicated by the dotted lines 88 of Fig. 3. By extended reach area is here meant the area over which the arms of a person sweep while his arms are extended and he is located in the central area C of the checking station. The outer limits of the extended reach area are indicated by dotted lines 90 in Fig. 4. Though the actual reach areas vary with individuals and vary somewhat with the position of the checker within the checking area, nevertheless, the limits of reach areas indicated are typical and representative of what is found in practice for an average individual.

The conveyor belt 20 is mounted flush with the loading platform 22 and the sacking platforms 24 and 26. The belt is mounted upon two drums 100 and 102 rotatably supported at opposite ends of a belt support frame 104 supported on the check stand by means of brackets 101 and a cross member 103. The frame 104 comprises a floor member 105 and two pairs of angle bars 106 and 107 extending from opposite ends thereof and skirts 108 and 109 that extend downwardly from the angle bars on opposite sides of the lower portion of the belt 20, as illustrated in Fig. 8.

A flat support member 110 is mounted upon the frame 104 in a position directly beneath the upper portion of the belt 20 so as to maintain that portion horizontal and in the plane of the platforms 22, 24 and 26. As illustrated in Fig. 5 the platform segments 112 and 114 are fitted within slots 116 and 118 respectively formed in the guard walls 40 and 43. The ends of these platform segments 112 and 114 adjacent the drums 100 and 102 are supported on adjustable screws 120 and 122 to facilitate raising and lowering the tapered ends of the platform members to facilitate the making of minor leveling adjustments.

The drive drum 100 is mounted upon a jack shaft 130 supported by bearings 132 attached to the angle bars 106. The driven drum 102 is mounted upon another shaft 134 supported on bearings 136 adjustably positioned on the other angle bars 107.

The jack shaft 130 is driven by means of the motor M through the medium of a driving sheave 138 and a driven sheave 140 keyed respectively upon the motor shaft 142 and the jack shaft, and an interconnecting V-belt 144 as indicated in Fig. 4.

Any stretch of the conveyor belt 20 is accommodated by adjustment of the positions of the bearings 136 on the angle bars 107. As indicated in detail in Fig. 9, the screws 146 and 122 for securing the bearings 136 on these angle bars pass through slots 150 and 152 in the angle bars and adjusting bolts 154 passing through a bore 155 in a cross-piece 156 at the end of the angle bars threadably engage the head of the outer screw. It will be noted that the front platform segment 114 is also supported by the screws 122. This arrangement facilitates carrying the platform segment 114 so as to maintain a constant spacing between this platform segment and the adjacent portion of the conveyor belt at the time that the positions of the bearings are adjusted to accommodate for belt stretch.

It will be noted in Fig. 8 that the microswitch 72 is supported on the floor member 105 of the frame 104.

The diverting arm 28 is pivotally mounted upon a shaft 158 that extends through the front platform segment 114 and is supported upon a bracket 160 secured to the guard wall 43, as illustrated in Figs. 4 and 5. The desired positioning of the diverting arm 28 is accomplished by means of a positioning arm 162 connected to the lower portion of the shaft 158, this arm being selectively engageable within two notches 164 and 165 formed in the upper edge of an arcuate positioning member 166 supported at the lower end of the bracket 160. The two notches 164 and 165 are separated by an intervening tongue 166 over which the positioning arm 162 must be lifted to move the diverting arm 28 from one position to the other. The outer portions of the arcuate positioning member 167 are tapered downwardly to facilitate returning the diverting arm 28 to the nearby notch if the diverting arm 28 is turned to a position adjacent the end guard wall 43 for any reason whatever. The shaft 158 is adapted to be raised and lowered relative to the bracket so as to facilitate movement of the positioning arm from one of these registering notches 164 or 165 to the other.

The check stand described above is compact and easy to use. In use, the customers unload the items to be checked onto the unloading platform 22 and they are fed by means of the conveyor belt 20 to the checker, who, in turn, after weighing and checking, places the items in position to be fed to a sacker. In this check stand, special provision is made for discontinuing the feeding of the stream of items to the checker if the checker is unable to keep up with the flow of items. However, as a practical matter, the speed of the belt is set at a value suitable to the checker so that he is able to maintain the items flowing in a nearly continual stream to him for checking so long as they are being steadily supplied by a customer.

In the particular arrangement shown, it is possible for an earlier customer to be loading the belt 20 while a later customer is loading the platform 22 preparatory to supplying the checker when the servicing of the earlier customer has been completed. In this event, the later customer who has loaded the platform 22 moves his items toward the platform segment 112 at the downstream end of the conveyor belt 20 so as to clear the remainder of the platform 22 for the benefit of the next following customer. It will be noted that the scale platform 86 and the sacking platform 24 are on the same side of the track 49 on the opposite side thereof from the checking station, thus leaving a space 170 adjacent the upstream end of the belt 20 and adjacent the scale 84 in which the customer may stand while he is paying his bill and receiving his change. The zone in which the customer stands is contiguous to the extended reach area of the checker, thus facilitating the passage of money and other items between the customer and the checker.

The use of a single conveyor belt 20 interconnecting the loading platform 22 and the sacking platforms 24 and 26 has the advantage that it speeds up the checker, since, if for any reason the belt stops by impingement of an item on the cross-arm 62, the items previously checked are no longer drawn away to the sacking platforms 24 and 26. Such delay has the effect of maintaining the checking at a steady reasonably high rate, if the speed of the conveyor belt 20 has been suitably adjusted.

The heights of the various platforms 22, 24 and 26, 50 and 82 are all adjusted to accommodate checkers comfortably so that they will not be required to work at surfaces or at devices which are either excessively high or excessively low.

From the foregoing description of the first embodiment of my invention, it is clear that I have provided a check stand which does facilitate rapid servicing of customers without excessive fatigue to a checker.

The second embodiment of my invention illustrated in Figs. 11–14 inclusive is very similar to the embodiment illustrated in Figs. 1–10 inclusive and described in detail above, except that the track 180 is of different construction, especially in that it employs two conveyor belts, a feed belt 182 and a discharge belt 184. Thus, the check stand illustrated in Figs. 11–14 inclusive comprises the same loading platform 22, the same sacking platforms 24 and 26, the same diverting arm 28, the same cash register platform 50, the same weighing scale platform 82, the same checking station 60, the same cross-arm 62, and the same frame 104 and a microswitch 72' which in this case is normally open, all arranged in substantially the same manner as in the embodiment of my invention first described hereinabove.

The feed belt 182 is arranged on a pair of drums 186 and 188 supported in bearings 190 and 192 on a support frame 193. The upper portion of the belt 182 between the drums 186 and 188 is maintained at the proper level by means of a support table 194. Similarly, the discharge belt 184 is mounted upon two drums 200 and 202 supported on the frame 104. Also similarly, the portion of the discharge belt 184 between drums 200 and 202 is maintained at proper level by means of a support table 204. Platform segments 206 and 208 at opposite ends of the track are adjustable relative to the adjacent parts of the belts by means of two adjusting devices 210 and 212 of the type described hereinabove and illustrated in Fig. 9.

An island platform 220 located between the adjacent portions of the two conveyor belts 182 and 184 is adjustably mounted upon screws 222 to provide a continuous checking path along the track.

In this embodiment of my invention a mechanism is provided for stopping the movement of the feed conveyor belt 182 when an item impinges upon the cross-arm 62 without, however, interfering with the movement of the discharge belt 184. The mechanism for achieving this result includes a main free-running two-groove sheave 224 journalled for free rotation upon a shaft 226 keyed to the driving drum 186 upon which the feed conveyor belt 182 is mounted. The sheave 224 is driven by the motor M through the medium of a V-belt 144 riding in one of the grooves 227, the sheave rotating continuously while the motor is energized, that is, while the check stand is in operation. The driving drum 200 of the discharge belt 184 is driven by the sheave 224 by means of a single-groove sheave 228 keyed to the shaft 230 of the drum 220 and by means of a V-belt 232 that engages the other groove 231 of the main sheave 224. The feed belt 182 is driven by the main sheave 224 only when coupled thereto through the medium of a solenoid actuated clutch 240.

The clutch 240 comprises a movable member 242 that is axially movable on the shaft 226, being rotatable therewith through the action of a spline 244 keyed to a sleeve or bushing 246 secured to the movable clutch member, the spline being slidable axially within a slot or keyway 247 on the outer end of the shaft 226. The movable clutch member 242 carries a pair of pins 248, 248 that are engageable with recesses 250, 250 in the outer face of the main sheave 224 to cause the movable clutch member to rotate with the sheave, thereby rotating the shaft 226. A normally extended compression spring 252 arranged concentrically with the shaft 226 between a cap 254 threaded to the outer end thereof and a flange 256 on the sleeve 246, normally urges the movable clutch member 242 into engagement with the sheave 224, thereby normally causing the driving drum 186 of the feed conveyor belt 194 to rotate while the motor is energized.

The disengagement of the movable clutch member with the sheave is accomplished by means of a solenoid 260 acting upon a magnetic core 262 that extends outwardly from the shaft 226 and coaxially therewith. The inner end of the magnetic core 262 is coupled to the movable clutch member 242 by means of a yoke including arms 264 the outer ends of which are fastened to the inner ends of the core and the inner ends of which are attached to ears 266 of a bushing or collar 268 encircling the outer ends of the sleeve 246.

The solenoid 260 is energized from power mains 270, the microswitch 72' being connected in one of the leads through which power is supplied to the solenoid. In this arrangement, since the microswitch is normally open, the clutch is engaged while the cross-arm 62 is in its normal position perpendicular to the axis of the track 180, but the microswitch closes, thereby energizing the solenoid, when the cross-arm 62 is deflected to any substantial degree from its normal position by impingement of an item thereon.

It is thus apparent that with the apparatus described the feed conveyor belt 182 continues to supply a stream of items to a checker in the checking station so long as the checker continues to lift the items over the cross-arm 62 and places them upon the discharge conveyor belt 184. However, if for any reason, the checker fails to lift an item, it is discharged by the feed conveyor belt onto the upstream side of the island platform 220. If the first item so discharged is small, it will not impinge upon the cross-arm 62. However, if it is large, or after a number of small items have been so discharged, an item will impinge upon the cross-arm 62 closing the microswitch 72' energizing the solenoid 260, disengaging the clutch 240, thereby stopping the motion of the feed conveyor belt 182. Thereafter, when the items impinging upon the cross-arm 62 are removed, the cross-arm is restored to its normal position by the microswitch opening the contacts of the microswitch 72', deenergizing the solenoid 260, permitting clutch 240 to engage, thereby causing the feed conveyor belt 182 to resume operation.

Regardless of whether the solenoid 260 is energized or not, the discharge belt 184 continues to operate carrying items to one or the other of the sacking platforms 24 and 26. This arrangement has the advantage that items that have been checked continue to flow to the sacker even though the checking operation itself may be interrupted for a short while. This arrangement facilitates the sacker and the checker, each performing his work at his own natural pace without requiring the pace of the sacker to fluctuate with that of the checker.

It will be clear from the foregoing that I have provided an improved form of check stand which expedites the servicing of customers and which reduces the cost of checking out customers. Though my invention has been described with reference to two specific embodiments thereof, it will be obvious that many changes may be made in the material, form, details of construction and arrangement of the elements without departing from the spirit of my invention. For example, some of the advantages of my invention may be achieved by employing a stationary cross-bar opposite the checking station to prevent the flow of any items past the checking station until they have received the checker's attention by actually being lifted over the cross-bar or by employing a platform island without a cross-bar to compel the checker to advance the items manually. Furthermore, a pivoted cross-arm impinged by movement of an item into a position opposite the checking station is employed to control either the motor or a solenoid, it will be understood that many other types of devices than a pivoted cross-arm may be employed for this purpose. For example, a pressure switch arranged beneath the belt may be employed for this purpose, or, if desired, a beam of light traversing the track may be employed to actuate a photoelectric cell, all as is well known to those skilled in the art. It is therefore to be understood that my invention is not limited to the specific embodiments thereof illustrated and described herein but that my invention encompasses all embodiments thereof that fall within the scope of the appended claims.

I claim:

1. In a check stand having a track leading from an unloading station to a sacking station, a motor-driven conveyor belt means arranged for translational movement in said track to feed a succession of items to be checked from said unloading station to a checking position that is located slightly upstream from the central portion of a checking station and from another position downstream from said checking position to said sacking station at the other end of said track, control means located downstream from said checking position and adjacent said track and substantially opposite the central portion of said checking station, said control means being actuated by an item conveyed thereto by said belt means, and means operated by said control means when actuated for stopping the translational movement of said conveyor belt means, whereby each of said items must be manually advanced from said checking position past said control means to said another position.

2. In a check stand having means defining a check out path leading from an unloading station to a sacking station past a checking station, a motor-driven conveyor belt arranged on a check-out path for feeding a succession of items to be checked to a checking position adjacent said checking station, said items being manually moved from said checking position to another position downstream therefrom on said check-out path, a movable arm extending across said conveyor belt path between said checking position and said another position, and means controlled by impingement of an item on said arm for stopping said belt.

3. In a check stand having an unloading counter and a sacking counter, means defining a track extending past a checking station from an unloading counter to a sacking counter, a first conveyor belt extending from said unloading counter to a point opposite said checking station for feeding a succession of items to be checked to a checking position adjacent said checking station, a second conveyor belt extending from another position that is adjacent said checking station and downstream from said checking position to said sacking counter, said items being manually moved from said checking position to said another position, means including a motor for driving said belts, said means including a normally engaged clutch interconnecting said motor and said first belt whereby both belts are normally moving, a movable arm extending across said track between said checking position and said another position, and means controlled by impingement of an item on said arm for stopping said first belt without stopping said second belt.

4. In a check stand having a track leading from an unloading counter to a sacking counter, a motor-driven conveyor belt means arranged in said track to feed a succession of items to be checked from said unloading counter to a checking position intermediate the ends of said track and from a farther position downstream from said checking position to said sacking counter at the other end of said track, said checking position being slightly upstream from the central portion of a checking station, and a cross-bar extending across said track at a position adjacent said checking station for stopping the movement of items past said checking station by said conveyor belt means whereby each of said items must be manually advanced past said cross-bar to said farther position.

5. In a check stand having a track leading from an unloading counter to a sacking counter, a motor-driven conveyor belt means arranged in said track to feed a succession of items to be checked from said unloading counter to a checking position intermediate the ends of said track and from another position downstream from said checking position to said sacking counter, said checking position being slightly upstream from the central portion of a checking station, an actuating element located between the remote ends of said belt means operable by an item advanced thereto by said belt means, and means controlled by operation of said actuating element for stopping the flow of items past said checking position to said another position whereby each of said items must be manually advanced from said checking position to said another position thereby assuring that each item is handled manually at said checking position.

6. In a check stand, a first counter, a second counter, a checking position intermediate said first and second counters, movable conveyor means disposed between said first and second counters and adjacent said checking position, driving means coupled to said conveyor means for causing said conveyor means to move between said first and second counters thereby to carry items to be checked past said checking position, and conveyor control means adjacent said conveyor means at said checking position and operatively coupled to said driving means, said control means being actuated by the movement of an item thereto by said conveyor means for stopping the movement of said conveyor means, whereby each of said items to be checked must be moved manually past the location of said control means.

7. The combination of claim 6 wherein said conveyor means comprises an elongated belt, said driving means comprises a motor coupled to said belt for moving said belt in translation, and said control means includes switch means for deenergizing said motor in response to the the actuation of said control means by the advancement of an item by said belt to said control means.

8. The combination of claim 6 in which said driving means comprises clutch means coupled to said conveyor means, said control means being coupled to said clutch means for controlling the engagement thereof.

9. The combination of claim 6 in which said conveyor means comprises an elongated movable belt and said control means comprises an elongated bar pivotally mounted at one of its ends at one side of said belt and extending across said movable belt in the path of items thereon and switch means responsive to pivotal movement of said bar for controlling the state of energization of said driving means.

10. In a check stand having an unloading counter and a sacking counter, means defining a track extending past a checking station from said unloading counter to said sacking counter, a first conveyor belt extending from said unloading counter to a point opposite said checking station for feeding a succession of items to be checked to a checking position adjacent said checking station, a second conveyor belt extending from another position that is adjacent said checking station and downstream from said checking position to said sacking counter, said items being manually moved from said checking position to said another position, means including a motor for driving said belts, said means including a normally engaged clutch interconnecting said motor and said first belt whereby both belts are normally moving, an actuating element located between the remote ends of said belts operable by an item advanced thereto by said first belt, and means controlled by operation of said actuating element for stopping said first belt without stopping said second belt.

References Cited in the file of this patent

UNITED STATES PATENTS

| | | |
|---|---|---|
| 1,881,898 | Olson | Oct. 11, 1932 |
| 2,237,080 | Muse | Apr. 1, 1941 |
| 2,317,438 | Bradley | Apr. 27, 1943 |
| 2,368,986 | Hem | Feb. 6, 1945 |
| 2,536,961 | Smith | Jan. 2, 1951 |
| 2,560,490 | Smith | July 10, 1951 |
| 2,569,711 | Foster | Oct. 2, 1951 |
| 2,599,909 | George | June 10, 1952 |
| 2,625,241 | Smith | Jan. 13, 1953 |
| 2,631,689 | Rubaloff | Mar. 17, 1953 |